(12) United States Patent
Ramakrishnan et al.

(10) Patent No.: US 8,028,563 B2
(45) Date of Patent: Oct. 4, 2011

(54) PRESSURE INTERFERENCE TESTING FOR ESTIMATING HYDRAULIC ISOLATION

(75) Inventors: Terizhandur S. Ramakrishnan, Boxborough, MA (US); John Tombari, Spring, TX (US)

(73) Assignee: Schlumberger Technology Corporation, Cambridge, MA (US)

( * ) Notice: Subject to any disclaimer, the term of this patent is extended or adjusted under 35 U.S.C. 154(b) by 12 days.

(21) Appl. No.: 12/651,779

(22) Filed: Jan. 4, 2010

(65) Prior Publication Data

US 2010/0101319 A1    Apr. 29, 2010

Related U.S. Application Data

(62) Division of application No. 11/773,175, filed on Jul. 3, 2007, now Pat. No. 7,665,356.

(51) Int. Cl.
  *G01M 3/02* (2006.01)
(52) U.S. Cl. .......................................................... 73/37
(58) Field of Classification Search ........................ 73/37
  See application file for complete search history.

(56) References Cited

U.S. PATENT DOCUMENTS

| | | | | |
|---|---|---|---|---|
| 4,230,180 A | * | 10/1980 | Patton et al. ................. | 166/185 |
| 5,285,852 A | * | 2/1994 | McLeod ........................ | 166/379 |
| 6,863,127 B2 | * | 3/2005 | Clark et al. ............... | 166/250.01 |
| 7,077,212 B2 | * | 7/2006 | Roesner et al. ............. | 166/382 |
| 2005/0270903 A1 | | 12/2005 | Ramakrishnan et al. | |
| 2005/0284625 A1 | | 12/2005 | Rodney et al. | |

FOREIGN PATENT DOCUMENTS

| | | |
|---|---|---|
| FR | 2071513 A5 | 9/1971 |
| WO | WO2006034580 A1 | 6/2006 |

OTHER PUBLICATIONS

Ramakrishnan et al., A Method for Continuous Interpretation of Permanent Monitoring Pressure Data, SPE International, SPE 90910, Sep. 2004, pp. 1-10.
Nelson et al., Special Cement Systems, Well Cementing, Cement Handbook, Second Edition, Schlumberger, 2006, Chapter 7, pp. 233-268. Anderson et al., Underground geological storage, IPCC Special Report on Carbon dioxide Capture and Storage, Chapter 5, Accessed Mar. 27, 2008, http://arch.rivm.nl/env/int/ipcc/pages_media/SRCCS-final/
IPCCSpecialReportonCarbondioxideCaptureandStorage.htm, pp. 197-276.
Van Everdingen, The Skin Effect and Its Influence on the Prodcutive Capacity of a Well, American Institute of Mining and Metallurgical Engineers, Petroleum Development and Technology, 1953, Petroleum Branch, vol. 198, pp. 171-176.

* cited by examiner

*Primary Examiner* — Hezron Williams
*Assistant Examiner* — Rodney T Frank
(74) *Attorney, Agent, or Firm* — Rachel E. Greene; Brigid Laffey

(57) ABSTRACT

A cased hole pressure test tool is used to determine the integrity of cement between two points in a borehole in terms of permeability or transmissibility. The test tool drills at least one probe hole through the casing up to the cement. In one embodiment, two probes are set and the dissipation of a pressure pulse through the cement initiated by the first probe is observed by the second probe. In another embodiment, one probe hole is in hydraulic communication with the borehole fluid and a single offset probe is set in another probe hole. Fluid (water) is then added to the borehole to cause a pressure increase in the borehole fluid. Detection of the pressure increase through the cement by the offset probe is indicative of a loss of hydraulic isolation. Packers may be used to isolate the portion of the borehole under test. A mechanism for generating a pressure pulse of known magnitude is also described.

13 Claims, 4 Drawing Sheets

Figure 3: Illustration of the second method of cement testing.

PRESSURE INTERFERENCE TESTING FOR ESTIMATING HYDRAULIC ISOLATION

CROSS REFERENCE TO RELATED APPLICATIONS

This patent application is a divisional from U.S. patent application Ser. No. 11/773,175 filed Jul. 3, 2007 now U.S. Pat. No. 7,665,356 which is incorporated by reference herein in its entirety.

FIELD OF THE INVENTION

The invention is generally related to oil and gas wells, and more particularly to determination of the integrity of cement between two points in a borehole as indicated by permeability or transmissibility.

BACKGROUND OF THE INVENTION

Geological sequestration of $CO_2$ is currently being studied as a possible method for mitigating the rapid rise of greenhouse gases in the atmosphere. For example, $CO_2$ might be sequestered in the permeable layers of formations associated with oil and gas wells. Such the permeable layers are typically located beneath an impermeable layer which form a natural barrier against upward movement of the $CO_2$. Well boreholes provide a pathway for moving $CO_2$ into the permeable layer. However, it is possible for leakage pathways to form through the cement annulus between the well casing and the formation. Cement, in a multitude of reaction steps, has been demonstrated to deteriorate and form $CaCO_3$ in the presence of $CO_2$ and water (see Ch. 7 Special Cement Systems, by E. B. Nelson et al., Cement Handbook, section on Cements for Enhanced Oil Recovery by CO2-Flooding). In order for long term $CO_2$ storage to be practical, relatively little of the injected gas can be permitted to leak back into the atmosphere (see IPCC's special report on carbon dioxide capture and storage, pg 197, 2006). It is therefore desirable and important to know the quality of the cement in a formation selected for $CO_2$ sequestration, both before and after injection of $CO_2$.

Until now, formation tests have been designed to measure the permeability of a reservoir. Although quantifying skin is a common practice in well testing, and it may be appealing to regard cement as a skin, conventional skin estimation procedures work only when skin is sufficiently transmissible, i.e., the skin zone permeability is not orders of magnitude smaller than that of the formation. The reason for this is the skin zone is treated as being in pseudo-steady state, i.e., pressure drop across the skin region is directly related to flux (van Everdingen, A. F. 1953, The Skin Effect and its Influence on the Productive Capacity of a Well, Trans. AIME, 198, 171-176). Consequently, existing techniques are not entirely suited to estimating degradation of cement.

SUMMARY OF THE INVENTION

In accordance with one embodiment of the invention, a method of estimating hydraulic isolation between first and second points in a material under test that is disposed between a hydraulically impermeable barrier and a geological formation comprises the steps of: forming first and second openings in the hydraulically impermeable barrier adjacent to the first and second points under test, the openings being formed up to, but not completely through, the material under test; causing a change in pressure at the second opening; at the first opening, measuring transmission of the pressure change across the material; and storing the measured pressure change for estimating hydraulic isolation between the first and second points.

In accordance with another embodiment of the invention, apparatus for estimating hydraulic isolation between first and second points in a material under test that is disposed between a hydraulically impermeable barrier and a geological formation comprises: an ablating component operable to form first and second openings in the hydraulically impermeable barrier adjacent to the first and second points under test, the openings being formed up to, but not completely through, the material under test; a probe operable, when set at the first opening, to measure transmission of a pressure change across the material in response to a change in pressure at the second opening; and a memory operable to store the measured pressure change, from which hydraulic isolation between the first and second points is estimated.

In accordance with another embodiment of the invention, apparatus for generating a pressure pulse of known magnitude comprises: a first chamber filled with an incompressible fluid; a second chamber filled with a gas, the second chamber hydraulically linked with the first chamber; a third chamber filled with an incompressible fluid, the third chamber hydraulically linked with the second chamber; a fourth chamber filled with an incompressible fluid, the fourth chamber hydraulically linkable with the third chamber via a first valve; means for sensing pressure in the third chamber; and means for sensing pressure in the fourth chamber, whereby a pressure pulse of a magnitude corresponding to the sensed pressure differential between third chamber and the fourth chamber with the valve closed can be generated by opening the valve.

In accordance with another embodiment of the invention, a method for generating a pressure pulse of known magnitude comprises: with a tool having a first chamber filled with an incompressible fluid, a second chamber filled with a gas, the second chamber hydraulically linked with the first chamber, a third chamber filled with an incompressible fluid, the third chamber hydraulically linked with the second chamber, a fourth chamber filled with an incompressible fluid, the fourth chamber hydraulically linkable with the third chamber via a first valve, means for sensing pressure in the third chamber, and means for sensing pressure in the fourth chamber, with the first valve in a closed state, creating a pressure differential between third chamber and the fourth chamber and, generating a pressure pulse of a magnitude corresponding to the sensed pressure differential by opening the first valve.

Further features and advantages of the invention will become more readily apparent from the following detailed description when taken in conjunction with the accompanying Drawing.

DETAILED DESCRIPTION

Figure 1:
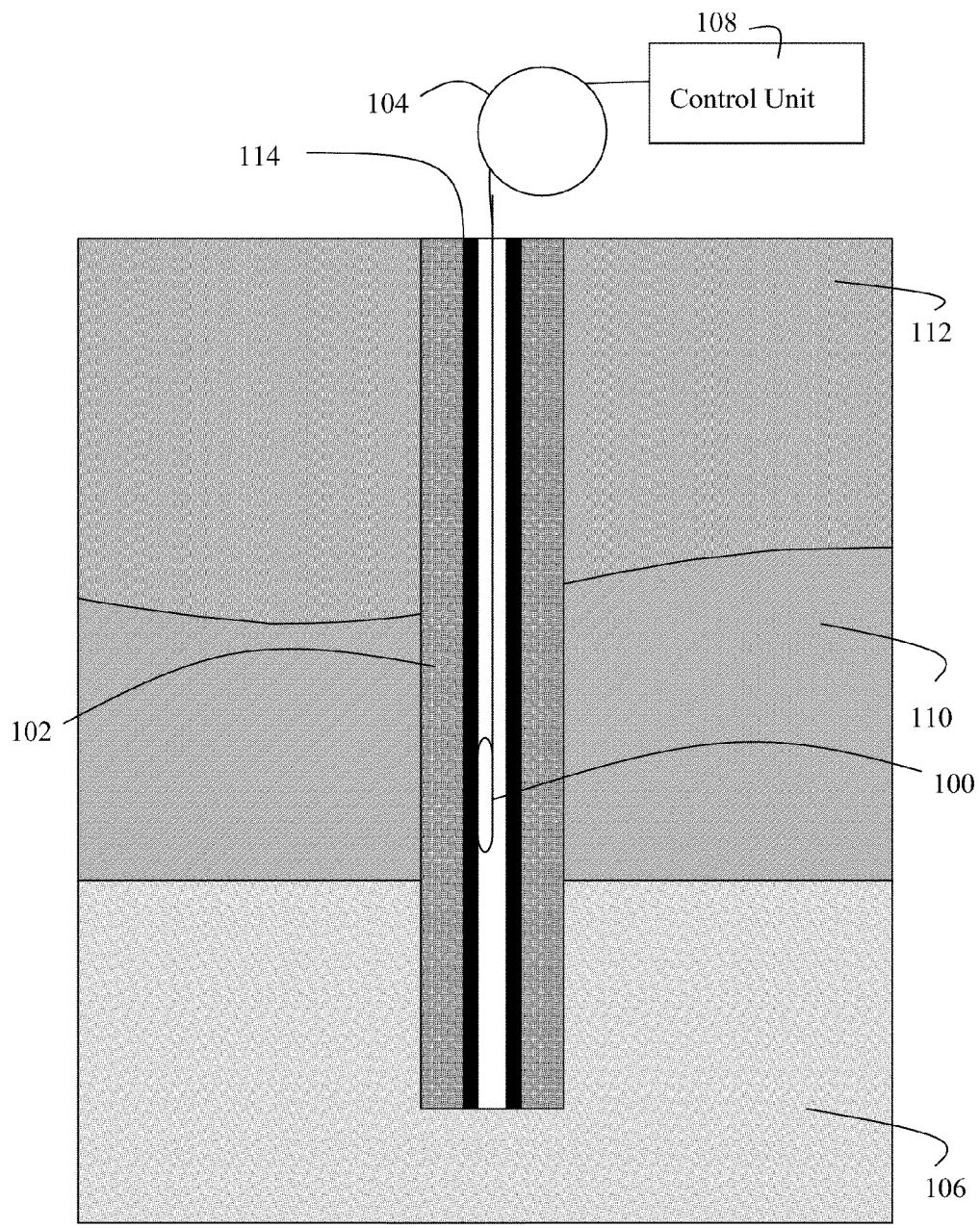
FIG. 1 illustrates a pressure tester tool utilized in a borehole to determine cement integrity adjacent to a permeable layer.

Referring to FIG. 1, a pressure tester tool (100) is utilized to test the integrity of cement (102) in a well completion. The pressure tester tool is secured to a spool (104) of cable located at the surface. The cable is spooled out in order to lower the pressure tester tool (100) into the borehole to a desired depth, e.g., above a permeable layer (106) into which $CO_2$ has been, or might be, injected. The pressure tester is in communication with a control unit (108) located at the surface via electrical, optical, wireless, or other suitable communications links, through which data and instructions may be transmitted and received. In the illustrated embodiment, the pressure tester tool is responsive to instructions transmitted from the control unit (108), and transmits pressure data to the control unit in real time. Although a tethering cable is shown, the pressure tester tool could be permanently installed in the borehole. Alternatively, the pressure tester might operate autonomously, and might accumulate data in memory for subsequent retrieval, e.g., when brought to the surface.

The formation surrounding the borehole includes the hydraulically permeable layer (reservoir) (106) adjacent to an impermeable layer (110) or seal, and various other layers which make up the overburden (112) (not shown to scale in FIG. 1). The permeable layer (106) is, potentially at least, utilized for carbon sequestration. The borehole is equipped with a completion which functions to maintain the structural integrity of the borehole within the formation. The completion also provides a hydraulic barrier between the formation and the borehole. In the illustrated embodiment the completion includes a tubular casing (114), which may be constructed of metal, fiberglass, or other substantially hydraulically impermeable material. The completion also includes cement (102) which is disposed in the annulus between the casing (114) and the formation (110). Ideally, the cement (102) should be structurally sound in order to prevent $CO_2$ leakage. The pressure tester tool is utilized to determine the integrity of the cement, particularly in the area above the permeable layer (106).

Figure 2:
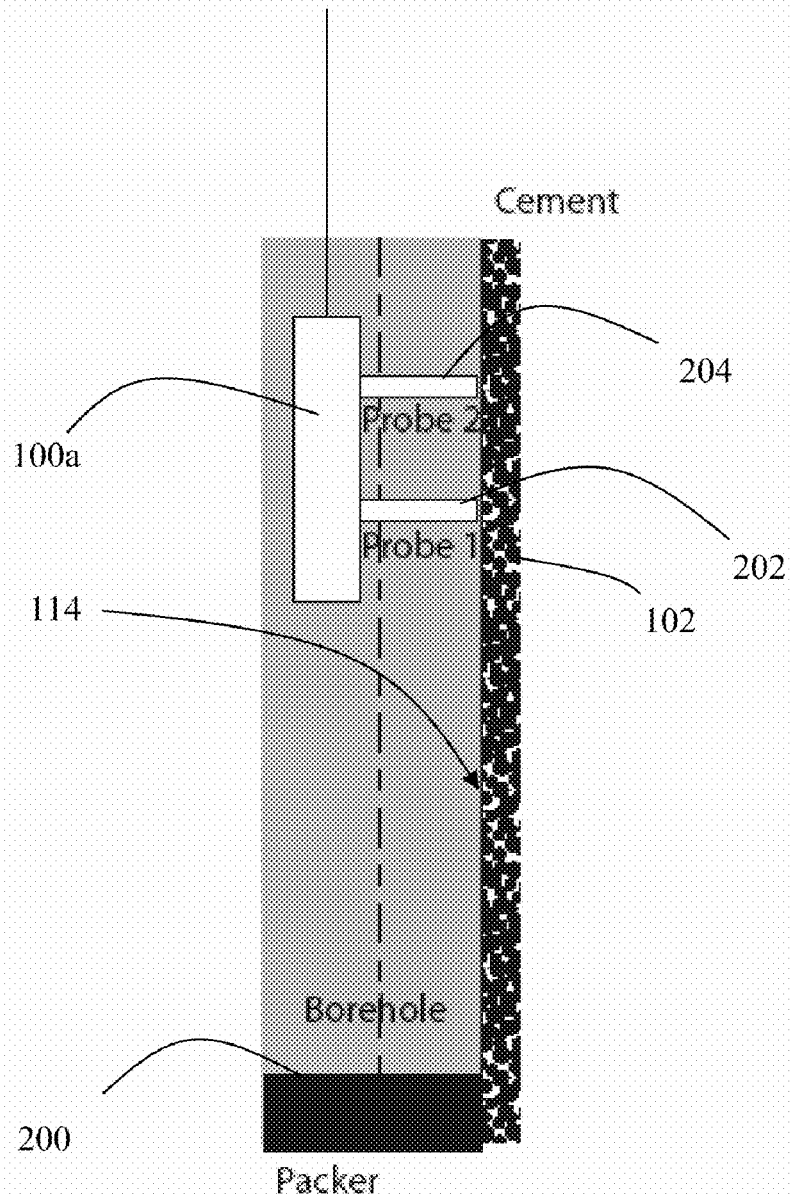
FIG. 2 illustrates a multi-probe pressure test tool.

Operation of one embodiment of the tester tool (100a, FIG. 2) will now be described with reference to FIGS. 1 and 2. Because of the relatively large diameter of the tester tool relative to the inner diameter of the casing, any injection tubing that is present may have to be pulled out before testing begins. A first packer (200) is set to close when the tubing is pulled out, and if necessary, a second packer is also set above the tubing packer (200). Typically, the annular cement (102) will be saturated with water as its pore fluid. In order to reduce tool storage induced delay and obtain the correct borehole pressure gradient, both the tool (100a) and the borehole are filled with brine in preparation for testing. This may be accomplished in a number of ways, including flushing the flowline with the borehole fluid after opening the hydraulic lines to the borehole. Alternatively, the tool may also be flushed at the surface. It is desirable that all residual gas in the tool flow lines are flushed out.

Holes are formed through the casing in order to prepare for a test of the integrity of the cement. The holes may be formed by mechanical, electrical, chemical or laser ablation. In the illustrated embodiment, the tool drills (mechanically) through the casing (114) with a bit in a first location in order to establish hydraulic communication with the cement (102). The drilling is stopped at the cement interface with the casing. This may be accomplished based on the known casing thickness, and by monitoring the torque on the drill bit. In particular, an initial increase in drill bit torque is indicative of contact with the casing, and a subsequent sudden change in the torque is indicative of the drill bit having reached the cement-casing interface. The length of travel of the drill bit (or quill) between torque gradient events may also be measured against the known casing thickness to verify or determine when to cease drilling. Drilling may continue some distance into the cement, but only to a distance smaller than the cement thickness such that the formation is not reached. In the illustrated embodiment, penetration of the drill bit into the cement is limited to a minute fraction of the overall thickness of the cement.

Once the hole has been drilled at the first location, a "sink" probe (202) is set at that location. The probe includes a seal which, when the probe is set, hydraulically isolates the probe sensor from the borehole fluid. Nevertheless, the set probe may read the cement fluid pressure as being about the same as the borehole pressure (equal to the brine column in gauge pressure) and, in the absence of any cement permeability, continue to hold this pressure. A slow drift suggests minor permeation through the cement, and that the fluid pressure in the cement column is different from that of the hydrostatic column pressure. This may occur due to pressure anomalies in formation layers. If no noticeable trend in pressure is seen upon setting the first probe, two possibilities arise: (i) no measurable hydraulic communication is present in the cement; or (ii) cement fluid is close to the borehole fluid pressure. The latter may be tested by adding more borehole fluid as explained in greater detail below and, if no observable trend in pressure exists, increased likelihood of the first possibility is indicated. One advantage to filling the borehole entirely with brine is that this will give a pressure equivalent to an entire hydrostatic column.

It is preferable for testing purposes that the borehole pressure be as close to the native cement fluid pressure as practical. One technique for accomplishing this is to start with a borehole fluid level height corresponding to a pressure that is slightly lower than the expected cement pressure. The probe is set first, and if there is an upward drift in pressure, the probe seal is relaxed, and more borehole fluid added. The probe is then set again, and the pressure trend noted. The cycle may be repeated as many times as necessary to achieve equalization, noting that each foot of water column height corresponds to about 0.43 psi of pressure increase at the bottom of the borehole.

Once the pressure drift is found to be small, and within acceptable range, a second (observation) probe (204) is set. Setting the probe includes hydraulically sealing the probe against the casing. The second probe should be in hydrostatic equilibrium with the first probe. After both probes are set, the internal hydraulic communication between the probes is terminated with an isolating valve. Note that the observation probe may be offset either horizontally, or vertically, or both. Further, multiple observation probes may be set in any combination of offsets.

Once the sink and observation probes are set, a pressure pulse is induced in the "sink" probe (202). The pressure pulse may be generated by a fixed pressure increase within the tool. The observation probe (or probes) are monitored for a responsive pressure signal. If a pressure pulse is observed at the observation probes, poor hydraulic isolation in the cement is indicated. The decay of the pressure within the pulsed probe as well as any observed pulse in the offset observation probe(s) may be used to adjudicate the effectiveness of cement isolation. In particular, the hydraulic isolation can be quantified based on the difference in time between the pressure pulse and the responsive pressure signal. In this manner the cement transmissibility and permeability may be calculated.

Figure 3:
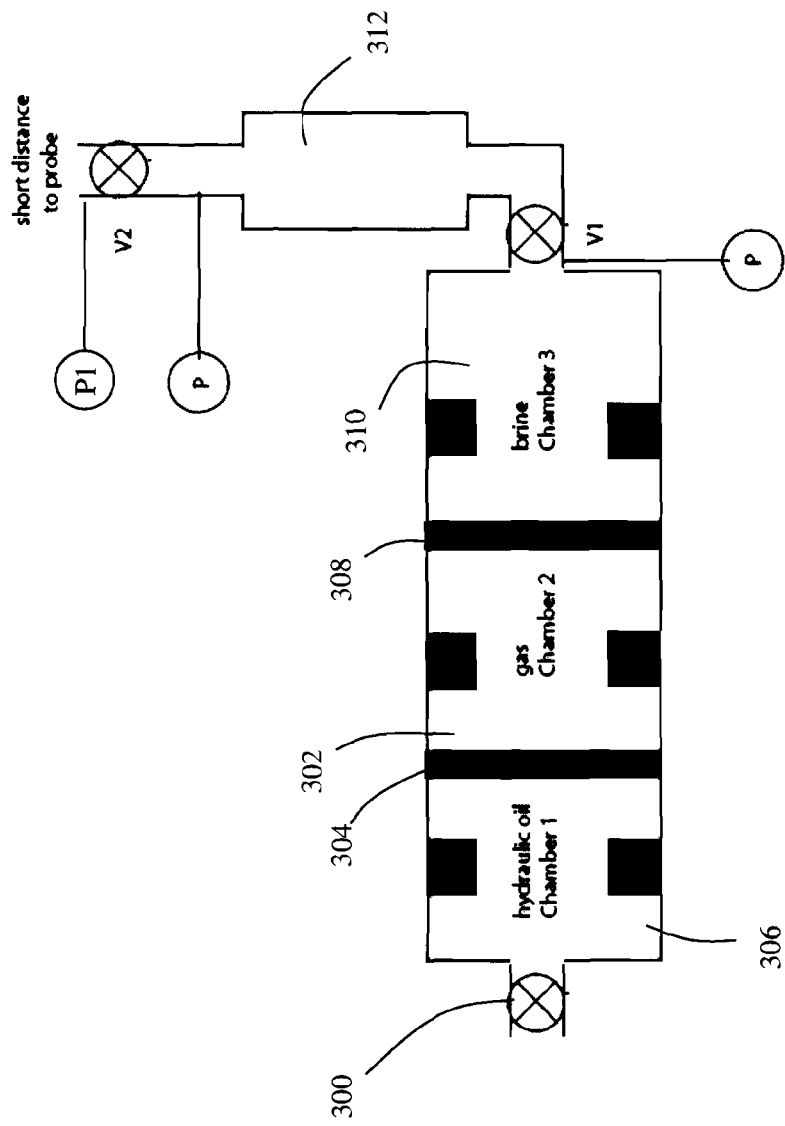
FIG. 3 illustrates a mechanism for generating a pressure pulse of known magnitude.

Those skilled in the art will recognize that it is quite difficult to control the pressure pulse with hydraulic lines filled with brine. An embodiment of a mechanism for reliably generating a pressure pulse of known magnitude is illustrated in FIG. 3. The illustrated pulse generator includes an isolation valve (V1) that may be actuated during testing in response to commands from either the control unit or the tool itself. Opening the isolation valve allows the brine in chamber (312) to hydraulically communicate to an air filled chamber (302) through a floating piston (308). Hydraulic oil in chamber (306) may be pumped on one side of the floating piston (304), which has stops on either side. A second piston (308) separates the air from the brine in a brine chamber (310) and the brine line (chamber) (312) to the probe. The second piston also has two stops, one of which it shares with the first piston.

In order to prepare to generate the pressure pulse, isolation valve (V1) is open and valve (V2) is closed. Valve (V2) should be as close to the probe as practical. Initially, the pressure is built in the probe line by pumping hydraulic oil into chamber (306), which compresses the air in the chamber, and which in turn builds pressure in the probe hydraulic line (312). When the pressure is built sufficiently (e.g., a few hundred psi, at most), the pumping is stopped and valve (V1) is then closed. In order to determine when the pressure is built sufficiently, pressure is monitored at one or more pressure sensors (P) and (P1). Valve (V2) is then opened in order to generate the pressure pulse. The resulting pulses in the pulsing probe as observed by pressure sensor P, and the pressure sensor P in a chamber (not shown) associated with the observation probe 1) may be differentiated and correlated, and the correlation time should be directly related to the permeability of cement. Detailed modeling will yield the exact nature of this correlation. The principles behind such correlations for a vertical well in an infinite medium are illustrated in published U.S. patent application 20050270903, and in an SPE paper, T. S. Ramakrishnan and B. Raghuraman, 2005, A Method for Continuous Interpretation of Permanent Monitoring Pressure Data, presented at the SPE/ATCE Annual meeting, SPE90910, both of which are incorporated by reference.

An alternative embodiment does not have valve (V2). In this embodiment the pressure buildup in the probe (at the cement interface) is relatively gradual, and will depend on the pumping rate of the hydraulic fluid and the compressibility of the air. Any inability to build pressure in this line implies continuous leakage of liquid into the cement, and if the pistons top out, it clearly indicates a complete disintegration or lack of cement at the zone of interest.

Testing in a monitoring well should be similar to that of the injection well if the well is perforated and has tubing. If the well has no tubing, and there are no perforations, assuming the diameter of the well will accept a cased hole formation tester, a packer is set below the test zone. As in the injection well, the well is filled with brine. The test then follows that of the procedure in the injection well.

Figure 4:
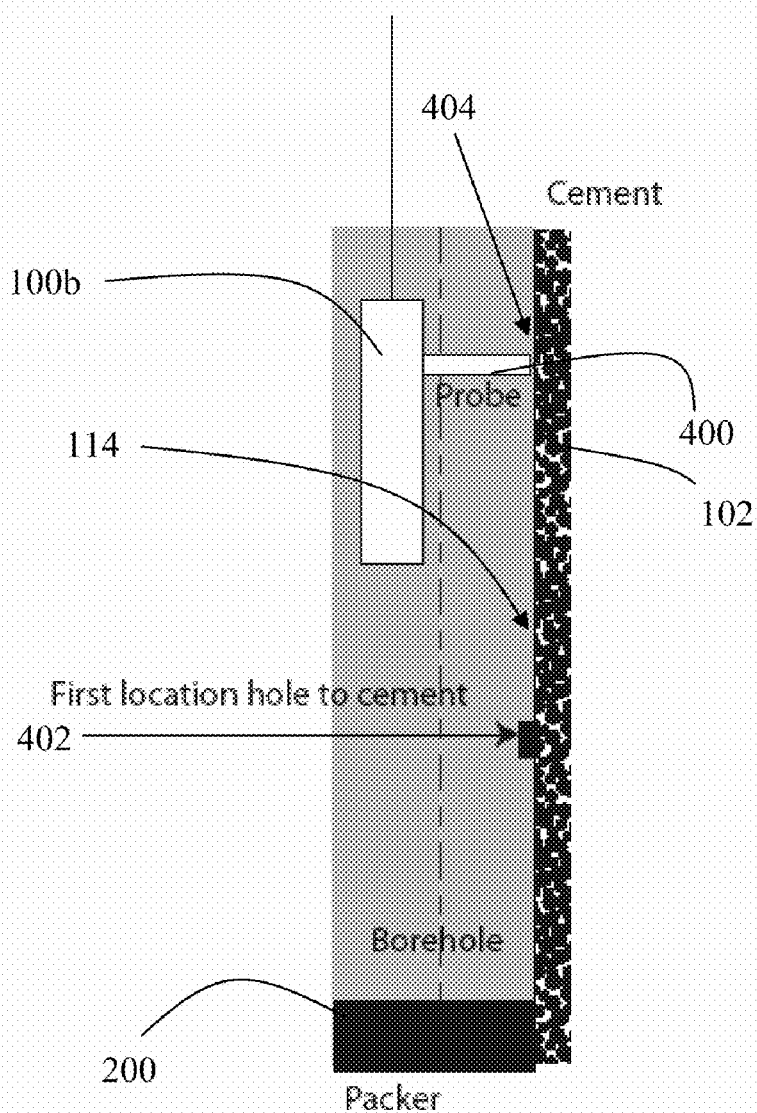
FIG. 4 illustrates a single-probe pressure test tool.

Referring now to FIG. 4, in an alternative embodiment of the test tool (100b), only one probe (400) is needed. As in the previously described embodiment, at least one packer (200) is set so that the bottom section of the borehole is sealed off. The probe (400) is initially set at a location (402), and a hole is drilled through the casing (114) to the cement (102). Fluid pressure (measurable only when the cement has a measurable permeability) is obtained by letting the probe come to equilibrium, as evidenced by an imperceptible decay in pressure. As discussed above, if the cement fluid pressure is measurable, the level in the borehole is adjusted so that the wellbore fluid pressure is in equilibrium with cement fluid pressure.

The next step is to retract the probe (400) from the wellbore and set it at an offset location (404), i.e., either horizontally or vertically displaced. Once the probe is set at an offset location (404), additional fluid is added to the borehole, or the borehole pressure is raised through air pressure at the top of the wellbore. A pressure increase of 10 psi may be adequate. An increase in the bottom hole pressure corresponding to the hydrostatic head therefore occurs. The pressure increase is communicated to the cement fluid through the hole drilled through to the cement in the first location. If the cement between locations (402) and (404) has a permeability at all, then location (404) would be found to have a slow and steady pressure increase from which the transmissibility between (402) and (404) may be inferred. In particular, the pressure increase over a period of time is matched with a pressure response over a period of time, and the time differential between the pressure increase and pressure response is indicative of transmissibility.

In the absence of tubing and perforations in the monitoring well, a packer is first installed in the casing adjacent to a shale layer above the formation that had $CO_2$ uptake. The remainder of the testing is carried as already described above.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus for generating a pressure pulse of known magnitude comprising:
   a first chamber filled with an incompressible fluid;
   a second chamber filled with a gas, the second chamber hydraulically linked with the first chamber;
   a third chamber filled with an incompressible fluid, the third chamber hydraulically linked with the second chamber;
   a fourth chamber filled with an incompressible fluid, the fourth chamber hydraulically linkable with the third chamber via a first valve;
   a fifth chamber filled with an incompressible fluid connected to the probe the fifth chamber hydraulically linkable with the fourth chamber via a second valve;
   means for sensing pressure in the third chamber; and
   means for sensing pressure in the fourth chamber;
   means for sensing pressure in the fifth chamber or the probe,
   whereby a pressure pulse of a magnitude corresponding to the sensed pressure differential between fourth chamber and the fifth chamber with the second valve closed can be generated by opening the said second valve, with the first valve shut in order to isolate the first, second and the third chamber from the fourth and fifth.

2. The apparatus of claim 1 further including a third valve operable to isolate an input to the first chamber.

3. The apparatus of claim 1 wherein the second chamber is hydraulically linked with the first and third chambers by first and second pistons, respectively.

4. The apparatus of claim 1 wherein the first chamber is filled with hydraulic oil.

5. The apparatus of claim 1 wherein the second chamber is filled with air.

6. The apparatus of claim 1 wherein the third and fourth chambers are filled with brine.

7. A method for generating a pressure pulse of known magnitude comprising:
   with a tool having a first chamber filled with an incompressible fluid, a second chamber filled with a gas, the second chamber hydraulically linked with the first chamber, a third chamber filled with an incompressible fluid, the third chamber hydraulically linked with the second chamber, a fourth chamber filled with an incompressible fluid, the fourth chamber hydraulically linkable with the third chamber via a first valve, a fifth chamber connected to a probe hydraulically linkable with the fourth chamber via a second valve, means for sensing pressure in the third chamber, means for sensing pressure in the fourth chamber, and means for sensing pressure in the fifth chamber, with the second valve in a closed state, creating a pressure differential between third/fourth chamber and the fifth chamber and, generating a pressure pulse of a magnitude corresponding to the sensed pressure differential by opening the second valve.

8. The method of claim 7 further including a third valve operable to isolate an input to the first chamber.

9. The method of claim 7 further including a valve operable to isolate an output of the fourth chamber.

10. The method of claim 7 wherein the second chamber is hydraulically linked with the first and third chambers by first and second pistons, respectively.

11. The apparatus of claim 7 wherein the first chamber is filled with hydraulic oil.

12. The apparatus of claim 7 wherein the second chamber is filled with air.

13. The apparatus of claim 7 wherein the third and fourth chambers are filled with brine.

* * * * *